(12) United States Patent
Geiser

(10) Patent No.: US 7,647,999 B2
(45) Date of Patent: Jan. 19, 2010

(54) MULTITRACK CURVE-TILTING VEHICLE, AND METHOD FOR TILTING A VEHICLE

(76) Inventor: Friedrich Geiser, Im Hag 12, Nueziders (AT) A-6714

( * ) Notice: Subject to any disclaimer, the term of this patent is extended or adjusted under 35 U.S.C. 154(b) by 537 days.

(21) Appl. No.: 10/589,286

(22) PCT Filed: Feb. 10, 2005

(86) PCT No.: PCT/EP2005/001340

§ 371 (c)(1), (2), (4) Date: Aug. 11, 2006

(87) PCT Pub. No.: WO2005/077683

PCT Pub. Date: Aug. 25, 2005

(65) Prior Publication Data

US 2007/0193803 A1 Aug. 23, 2007

(30) Foreign Application Priority Data

Feb. 13, 2004 (CH) .................................. 00238/04

(51) Int. Cl.
*B62K 11/00* (2006.01)
(52) U.S. Cl. .................................................... 180/210
(58) Field of Classification Search ............. 180/210, 180/211, 215; 280/124.103, 124.106
See application file for complete search history.

(56) References Cited

U.S. PATENT DOCUMENTS 2,819,093 A * 1/1958 Geiser .................. 280/282
2,998,263 A   8/1961 Muller et al.
3,781,031 A * 12/1973 Patin .................... 280/62

(Continued)

FOREIGN PATENT DOCUMENTS

DE    42 01 412 A1    7/1993

(Continued)

*Primary Examiner*—Faye M. Fleming
(74) *Attorney, Agent, or Firm*—Rothwell, Figg, Ernst & Manbeck, P.C.

(57) ABSTRACT

A curve-tilting vehicle, e.g., a three-wheeled vehicle (30), including a laterally tilting device (4) at least one section (5) of the vehicle by a tilting axis (6) that runs substantially parallel to the longitudinal axis (3) of the vehicle such that the center of gravity of the vehicle can be displaced perpendicular to the direction of travel when driving, especially in curves or on a sloped or uneven ground. The vehicle includes at least one vehicle seat (8a) that is disposed in the tilting section (5) of the vehicle and is allocated to the driver who steers the vehicle. The vehicle further includes a detector (9a) for detecting a lateral force of the seat, which the body of the driver applies at least to one zone of the vehicle seat (8a) in a lateral direction (10a) extending perpendicular to the direction of travel. The lateral force of the seat may be detected using a pivotal spring-centered vehicle seat (8a). The detector (9a) is effectively connected to the lateral tilting includes (4) in such a way that lateral tilting occurs in accordance with the detected lateral force of the seat while the tilting speed is a function at least of the lateral force of the seat and the vehicle speed, the tilting speed increasing as the lateral force of the seat rises at a factor that decreases as the speed of the vehicle goes up. The invention further relates to a method for tilting such a vehicle.

20 Claims, 3 Drawing Sheets

U.S. PATENT DOCUMENTS

| | | | |
|---|---|---|---|
| 4,064,957 A * | 12/1977 | Parham | 180/215 |
| 4,368,796 A | 1/1983 | Patin | |
| 4,921,263 A | 5/1990 | Patin | |
| 6,026,920 A | 2/2000 | Obeda et al. | |
| 7,467,802 B2 * | 12/2008 | Peng et al. | 280/124.103 |
| 2002/0173892 A1 | 11/2002 | Oh | |
| 2003/0098662 A1 | 5/2003 | Stachowski et al. | |

FOREIGN PATENT DOCUMENTS

| | | |
|---|---|---|
| DE | 44 06 245 A1 | 1/1995 |
| DE | 195 01 087 A1 | 7/1996 |
| DE | 197 38 826 A1 | 3/1999 |
| DE | 100 12 035 A1 | 9/2001 |
| FR | 2 450 480 A1 | 9/1980 |
| WO | WO 99/47372 | 9/1999 |
| WO | WO 99/54186 | 10/1999 |

* cited by examiner

MULTITRACK CURVE-TILTING VEHICLE, AND METHOD FOR TILTING A VEHICLE

CROSS-REFERENCE TO RELATED APPLICATION

This application is a National Phase of International Application Serial No. PCT/EP2005/001340, filed 10 Feb. 2005.

BACKGROUND OF THE INVENTION

1. Field of the Invention

The invention relates to a curve-tilting vehicle having means for laterally tilting at least one section of the vehicle about a tilting axis running essentially parallel to the vehicle's longitudinal axis, to the effect that while traveling, for instance in a bend or on sloping or uneven ground, the center of gravity of the vehicle can be displaced in a direction perpendicular to the direction of travel. The vehicle comprises at least one vehicle seat disposed on the tiltable section of the vehicle and intended for a driver steering the vehicle. The vehicle in general may be any multitrack motor or muscle-powered vehicle such as a road vehicle with wheels, a snowmobile with runners, or a watercraft with foils, having at least three points of support on a ground formed, e.g., by a roadway, snow, ice, or water. The invention further relates to a method for tilting such a vehicle.

2. Description of the Background Art

Multitrack curve-tilting vehicles which owing to their chassis geometry have driving properties similar to those of a single-track vehicle are known in different variants from the prior art. Amongst others, such vehicles have been described in FR 2,550,507, FR 2,616,405, DE 01,063,473, DE 02,707, 562, DE 03,546,073, DE 195,13,649, and WO 97/27,071, and are fitted, for instance, with two wheels arranged symmetrically to the vehicle's longitudinal axis, side by side and with a mutual distance, to both sides of the center of gravity, and with a third wheel in the central track in the longitudinal axis, between the two wheels but offset relative to these wheels in or against the direction of travel, with either the two lateral wheels or the central wheel being directionally steerable.

The wheel suspensions of the two lateral wheels are coupled with each other and mounted so as to be able to move essentially in the direction of the vehicle's vertical axis, in such a way that a movement of one of the wheel suspensions in one direction, say, upward, will lead to an opposite movement of the other wheel suspension in the other direction, say, downward. In this way a free tilting of the vehicle about the tilting axis that runs essentially parallel to the vehicle's longitudinal axis can be realized. The reverse coupling can be realized, for instance, mechanically with a steering parallelogram, a balance suspension, or cable lines, hydraulically with two hydraulic cylinders interconnected hydraulically, or electrically with electric motors. It is possible as an alternative to replace the central wheel with two other lateral wheels mobile and coupled in reverse in the direction of the vehicle's vertical axis, which also leads to free tiltability of the vehicle. The lateral wheels that are mounted in parallelogram fashion act as a fictitious single central wheel. In the versions described, pendulum motions and inclinations can be realized largely free of any resistance, and inclining the wheels in parallelogram fashion relative to the ground contributes by gyro-type precession to stabilizing the vehicle in a way similar to a motorcycle or bicycle, hence the driver is provided with a road feeling largely equal to that of the well-known motorcycle feeling. This state of free tiltability of the vehicle will be described in what follows, therefore, as "two-wheel mode".

For the purposes of preventing undesired inclination and tipping over of the vehicle at low speeds or at rest, part of the curve-tilting vehicles known from the prior art have devices restricting or blocking the free mobility of the lateral wheel suspensions at low speeds, and where applicable enabling an active righting or tilting of the vehicle. It is possible then to secure a stabilization of the vehicle at rest by blocking of the free mobility of the lateral wheel suspensions without necessitating an intervention of the driver's legs. This is an advantage more particularly in the case of heavy vehicles which at rest could only be stabilized with a larger effort. In the following, this stable state where a free tilting of the vehicle by countersteering or by a weight shift of the driver is not possible will be designated as "three-wheel mode", regardless of whether the vehicle is a tilting vehicle having three or more wheels or other elements of support. In this pure "three-wheel mode", the vehicle can only be tilted actively by a tilting device, but not by a weight shift of the driver or by a centrifugal force attacking directly at the tiltable section, as for instance by the countersteering known from two-wheel vehicles.

It is also known from the prior art that is it advantageous to form a transition zone between the pure two-wheel mode and the pure three-wheel mode. In this intermediate zone the free tiltability is influenced by the partial action of generated tilting forces, and more particularly by forces opposing tilting. In this way it is possible, for instance, by active generation of a force opposing tilting to prevent the vehicle from tipping over when an overly strong tilting is provoked by the driver shifting his weight or steering.

In practice, however, problems are associated exactly with this transition zone from the two-wheel mode, that is, the state of free mobility of the two lateral wheel suspensions, to the three-wheel mode, that is, the state in which a free lateral tilting is prevented by blocking of the free mobility of the lateral wheel suspensions. Because, an automatic active interference with the vehicle's free tiltability is perceived as unpleasant and strange by the driver, and will provoke startled reactions of the driver, sometimes dangerous. While the vehicle at higher speeds has the typical properties of a motorcycle, at low speed or at rest it behaves like a multitrack carriage that cannot be tilted at all by the driver, or only by a targeted but nonergonomic action of the driver.

In WO 95/34,459 a self-stabilising three-wheel vehicle having a power-assisted tilting element for tilting one vehicle section about the vehicle's longitudinal axis is described. The vehicle is self-balancing, and comprises a sensor associated with a directionally steerable wheel and capturing the size and direction of the load that will have to be applied to the directionally steerable wheel in order to produce and/or maintain a change of direction of this wheel during a motion. To this end the sensor is connected with the tilting elements in order to produce a tilting that depends on the sensor's pick-up. Thus, the tilting of the vehicle essentially depends on the steering forces and angles.

In the U.S. Pat. No. 4,368,796 a device for controlling the tilt of a vehicle is described. The change of tilt is accomplished via a pendulum operatively coupled with a tilt change mechanism of the vehicle. In an embodiment said to be preferred, the seat squab of the vehicle seat is pivotable, and fitted with a fork underneath that is able with a certain play to influence the excursion of the pendulum. It is thus possible to deflect the pendulum even in the absence of a centrifugal force or lateral tilt of the vehicle, by the driver strongly laterally shifting his body weight on the driver's seat. It is an essential disadvantage of this system that independently of speed, between the tilt sensing system and the vehicle seat a coupling exists that may lead to dangerous situations, particularly at high speeds where an excessive active interference with the vehicle's tilt is undesirable. It is not possible to provide to the driver the typical driving behavior of a two-wheeled vehicle, since vehicle tilt is achieved in an active way via the pendulum while the driver always is centrally poised on the vehicle, and he may influence the tilting behavior of the vehicle via a displacement of his center of gravity, only when judging that the angle of tilt of the vehicle is not sufficiently large. Because, the tilting behavior of a two-wheeled vehicle is influenced in particular, on the one hand by the gyroscopic forces of the wheels that increase with increasing vehicle speed, and on the other hand by weight shifts of the driver, and the stability of the two-wheeled vehicle increases with increasing vehicle speed. In view of the fork's play that must be provided, it is not at all possible to exercise a sensitive control of vehicle tilt by weight shifts.

From WO 97/27,071, a vehicle is known that has two arms placed side by side and supporting the vehicle above ground. The arms can be coupled by intervening elements so that specific relative positions may be fixed, and in a particular embodiment adjusted actively relative to each other, thus changing the vehicle's tilt. In normal operation called the two-wheel mode, the vehicle described admits pendular motions almost without any resistance, as well as inclined positions, the vehicle behaving as if traveling on a fictitious central rear wheel. In this mode of operation, tilt is achieved essentially by weight shifts of the driver. Two arms are pivoted at a frame of the vehicle. At their far ends, these arms are each provided with one wheel. At the ends of the pivoting axes of the arms facing the center of the vehicle, intervening elements are provided which are fixedly attached to the pivoting axes of the arms, and twist in opposite directions during pendular motions. At the vehicle frame's front end, a front wheel fork is connected with a front wheel and a handle bar. In one embodiment, the two arms are connected with a balance which in its fulcrum is pivoted at the vehicle's frame and which provokes the reverse movements of the arms. The arms may be interconnected via spring-damped legs. In another embodiment, the reverse movements of the arms are produced by circular cable lines. In addition, embodiments are described in WO 97/27,071 where the reverse movements are made possible by a bevel gearing or by a hydraulic compensation. The hydraulic compensation couples the arms that can be adjusted by hydraulic cylinders, so that they will move in opposite directions, the two hydraulic cylinders communicating via a connecting pipe that may include a pressurized gas reservoir for the vehicle's suspension and a check valve for arresting the arms. In addition, various devices for blocking or influencing the pendular motions are shown. Another device for influencing the pendular motions that is described, allows the vehicle to be righted vertically on the roadway via a pincerlike device that is contracted via Bowden cables, so that two props positioned at the two intervening elements are forced into like axial positions.

The document WO 97/27,071 further describes a three-wheeled vehicle in which the intervening elements influencing the pendular motions are levers connected with the levers of a central actuating unit via two tie rods. In one embodiment described, the vehicle includes an arrangement for capturing the speed, a tilt or equilibrium sensor, and additional control buttons to the left and right having a proportional effect for a manual tilt change by the driver. These control buttons may be provided on a handle bar or within the range of the driver's knees, for instance. All commands and response signals are processed in an electrical or electronic control unit and from there forwarded to an actuating unit that is electrical, for instance. With this particular design, specific positions of the arms can be attained at will or by automated remote control, particularly so within a range of speeds up to approximately 4 kmph. At these low speeds, self-stabilization of the vehicle that comes about more particularly through the gyroscopic action of the wheels is still not sufficient for a smooth straight forward motion of the vehicle. In the vehicle described, the reverse mobility of the arms therefore is blocked at a predetermined minimum speed, of for instance 4 kmph, and the vehicle righted into a vertical position from an inclined position that might not be desired. This function relieves the need for the driver to put his feet to the ground, inasmuch as in its normal position the vehicle is kept from tipping over by the lateral wheels. A further improvement in driving properties is achieved according to WO 97/27,071 by a multiple-disk clutch used as a means of intervention between the two ends of the axes of the arms that serve as the intervening elements. With the disk clutch engaged, the reverse movements of the arms are blocked. This blocking action occurs when the vehicle in its normal position falls short of a certain minimum speed. In a further development of this vehicle, an additional tilt sensor in the shape of a pendulum measures a possible lateral sloping of a roadway or a centrifugal force, so that at low speeds the vehicle will always be brought into an upright position or a position that is appropriate for the speed in a bend. Commands of a central actuating unit are translated by the multiple-disk clutch, a mechanical load momentum cut-out, and an electric motor with gears. When the speed falls below a minimum of 4 kmph, there is an automatic changeover from free mobility of the arms, that is, the "two-wheel mode", to an automatic equilibrium control via the equilibrium sensor, so that the vehicle will remain vertical even on a roadway that is sloping laterally. A tilting of the vehicle by weight shifts of the driver is not possible in this mode, since the clutch is engaged and the arms cannot freely move relative to each other. If in this automatic equilibrium control mode a bend is entered, the vehicle will automatically tilt according to speed and radius of the bend, in response to the deflection of the pendulum in the tilt sensor that is caused by the centrifugal force. For initiation of a curve or rapid evasion manoeuvres in this mode, the driver may influence the vehicle's inclination, more particularly in its tendency rather than forcibly, by actuating the left-hand or right-hand control button at the handle bar or knees. The influence produced is proportional to the pressure exerted on the particular control button, but is limited above by a signal of the tilt sensor in order to prevent tipping over.

In the curve-tilting vehicles described above, essentially the entire vehicle is tiltable, while from the prior art and more particularly from WO 98/24,681 or DE 3,226,361 A, curve-tilting vehicles are known that have a twisting two-part part design with a tiltable front part, with a steerable front wheel centrally disposed and with a vehicle seat, and a rear part with two wheels that cannot be tilted. As such vehicles do not tilt in their entirety, and not all wheels assume an inclined position during tilting, so that the gyro precession forces act in different planes and the geometry is also quite different, the driver will experience the driving behavior of a motorcycle to a degree only.

In the document DE 195,01,087 A1, a steerable light vehicle having a driver seat that can be tilted laterally is described, where when driving through a bend the driver can shift his body in the direction of the curve's center while leaning into the seat, or the driver's seat is actively tilted in the direction of the curve's center. The driver's seat and the remainder of the vehicle are operatively coupled in such a way that active or passive tilting of the driver's seat may raise the driving comfort, in that either the driver himself may lean into the bend on his own effort, or the driver's seat is tilted at least partially into the bend. In the latter case, driving states producing the seat readjustment are captured by sensors.

The multitrack curve-tilting vehicles of the prior art described above have the common problem that more particularly at low speeds, a balancing of the vehicle or a tilting as desired by the driver is possible to a degree only, or is perceived as unpleasant or strange by the driver. Some known solutions, it is true, are found to be satisfactory at higher speeds, where the vehicle is in the two-wheel mode and free tiltability of the vehicle is possible, so that the driver essentially is given the feeling of riding a two-wheeled vehicle. When driven at low speeds or at rest, however, known multitrack curve-tilting vehicles are found to be problematic. A use of the feet for stabilization of the vehicle is highly dubious at times, since the mass of some of these vehicles is too large for their safe stabilization, or their closed cabin will prohibit any use of the feet. Tipping over may give rise to important injuries of the legs, arms, and head in particular. The danger of tipping over is in fact reduced by blocking of the free tiltability, that is, by a switching to the three-wheel mode that occurs as a function of speed, and more particularly automatically so, but in this mode a tilting of the vehicle can only be achieved by manipulating actuating elements, or via a tilting sensor triggering an active tilting at low speeds on roadways that slope or bend. An active tilting of the vehicle is perceived as unnatural and unpleasant by the driver, since generically a tilting sensor may trigger the active tilting, only after it has captured an inclined position or centrifugal force. Tilting control via a tilting sensor is definitely problematic, primarily when driving an uneven road at low speeds not admitting free tiltability of the vehicle, where the stabilizing gyroscopic forces of the wheels are too small and the vehicle must be driven in the three-wheel mode. During a sudden tilt of the vehicle as, for instance, when hitting a larger pothole with one of the lateral wheels only, the vehicle will strongly tilt sideways at first. Only at that point this inclined position will be captured by the tilt sensor, so that in a subsequent step the vehicle is actively tilted back into the vertical position. Having passed the pothole, the vehicle being in a tilted state will once more take on an inclined position, so once again the tilt must be adjusted actively via the tilt sensor. It would be possible for the driver recognizing such a situation, for instance prior to driving over an incline, to manually preadjust the tilt by himself, but this possibility is found to be nonergonomic and hardly practical. Even a transition zone between two and three-wheel mode where merely the tilt trend is influenced will resolve matters to a degree only. A further problem arises when entering a bend at low speeds. From a two-wheeled vehicle, the driver would have the habit of moving his weight to the side even prior to the change in direction, or briefly steer into the opposite direction, so that the vehicle leans into the bend to be entered, even prior to the real change of direction. The bend is really taken on while the vehicle tilts, so that the vehicle tipping laterally into the curve is intercepted by the centrifugal force. However, this familiar driving behavior of motorcycles cannot be simulated with known multitrack curve-tilting vehicles at low speeds. As some of these vehicles have a higher weight than motorcycles, they will admit a stabilization or control of tilt by shift of weight of the driver on the vehicle following the human sense of equilibrium, only in part at higher speeds, so that a feeling of driving a motorcycle can be communicated in part, only at higher speeds.

With a driver taking up an eccentric position, where a free tilting by weight shift is not possible at all, only an active tilting is possible. In the prior art, tangible tilting can only be initiated by active manipulation of an actuating unit by the driver or as a reaction to a centrifugal force or steering movement, so that it will not be possible to drive the vehicle by weight shifts like riding a motorcycle.

Known multitrack curve-tilting vehicles meet considerable problems of acceptance by drivers, since at higher speeds in the two-wheel mode they have completely different tilting properties than at lower speeds in the three-wheel mode, inasmuch as the driver may trigger a tilting by shifts of body weight only at higher speeds but not at low speeds.

An anticipating mode of driving providing for a sensitive adjustment of lateral tilt of the vehicle even prior to entering a bend or sloping roadway is possible in an ergonomically acceptable way with multitrack curve-tilting vehicles of the prior art, neither by manual intervention of the driver nor by automatic interventions.

SUMMARY OF THE INVENTION

It is a task of the invention, therefore, to provide a multitrack curve-tilting vehicle distinguished by a lateral tiltability that can be influenced intuitively by the driver and matches his expectations, both at higher and at lower speeds, while offering good stability under all driving conditions. It is another task of the invention to improve the generic multitrack curve-tilting vehicles known from the prior art, and more particularly the three-wheeled vehicles known from WO 97/27,071, with respect to their lateral tilting properties.

This task is accomplished by realising the characterizing features disclosed herein. Features constituting an alternative or advantageous further development of the invention are also disclosed herein.

The invention is based on recognizing that even slightest equilibrium changes are captured by the highly sensitive human sense of balance, and give rise to involuntary compensating motions, and that centrifugal forces due to a lateral acceleration that act on the human body of a driver operating a vehicle during a change of direction, a change in lateral inclination of the vehicle, or even the mere intention of the driver to change the direction or inclination of the vehicle just prior to entering a bend, for instance, will lead to an intuitive active movement of the human body by which the driver tends to displace the center of gravity of his own body toward that side toward which the vehicle should tilt, in his judgment. This effect can be seen for instance when driving a conventional multitrack passenger car. Even before entering a bend and steering, the driver intuitively displaces the center of gravity of his body in the direction of the bend by moving his trunk from an upright to a slightly inclined position. In this way the upper part of the trunk exerts a force in the direction of the bend, the lower part of the trunk exerts a force against the direction of the bend. During a lateral tilt of the vehicle which he wants to counteract, the driver again will try to displace the center of gravity of his body laterally in the direction toward which the vehicle is supposed to tilt.

According to the invention, a lateral force is captured that is exerted by the body of the driver of a laterally tiltable multitrack vehicle onto at least a vehicle-seat portion of a vehicle seat disposed on a tiltable section of the vehicle, in a lateral direction perpendicular to the direction of travel. This lateral sitting force is the result of intuitive active displacement of the center of gravity of the driver's body by slight inclination of the trunk. Depending on the point of capture, therefore, this lateral sitting force acts laterally in the direction of the desired tilt in the region of the torso, and in the opposite lateral direction in the region of the pelvis and seat squab. The lateral sitting force is captured by means of detection operatively connected with the means for lateral tilting of the vehicle in such a way that the lateral tilting occurs as a function of the captured lateral sitting force and that the speed of tilting is a function, at least of the lateral sitting force and of the speed of the vehicle, the tilting speed increasing with increasing lateral sitting force, but with a factor decreasing with increasing vehicle speed. At high speeds, therefore, a lateral sitting force will give rise to a smaller response, or to no response at all, of the means for active lateral tilting of the vehicle while at low speeds the operative connection between the means of detection and the means for lateral tilting is more sensitive. In this way the typical driving behavior of a two-wheeled vehicle is simulated, which at high speeds because of the gyroscopic forces of the wheels exhibits a much higher stability, and hence will react much more slowly to a shift of weight of the driver, than at low speeds. The means for lateral tilting may be constituted by actuators known from the prior art, and particularly so by hydraulic, electrically driven, or pneumatic actuators. The tilt angle may be influenced by these actuators, either in its trend, for instance by applying a countermomentum while, in the absence of a lateral sitting force, the vehicle can be tilted essentially freely without any influence of the actuators, or forcibly, where a free tilting of the vehicle is not possible and a change of lateral tilt is solely a function of the lateral sitting force and of other variables that may have been captured, such as the vehicle's speed, the steering angle, the inclination, or the centrifugal force. An intermediate zone between these two modes is possible, of course, where the influence of the actuators more particularly depends on speed and decreases with increasing speed.

In one possible embodiment, the means for lateral tilting and the operative connection are designed in such a way that in the absence of a lateral sitting force the vehicle can be tilted essentially freely and uninfluenced by the actuators, and that a tilting by intervention of the actuators will only occur when a lateral sitting force is operative. In this particular embodiment, this intervention occurs in such a way that free tiltability of the vehicle in the direction in which the active tilting by the actuators takes place, is maintained to the extent that an additional free tilting is still possible, but that a free tilting in a direction opposite to that of active tilting is opposed by the actuators. This function is significant, for instance, out of safety considerations, since during an active tilting in a particular direction that is triggered by a lateral sitting force, when an additional external tilting force in the same direction appears, such as when driving over a curbstone at the inside of the bend, the vehicle may freely tilt even further to this side but will not tip over toward the outside of the bend.

The lateral sitting force acting in a direction perpendicular to the direction of travel, is understood to also include a torque about an axis running essentially parallel to the vehicle's longitudinal axis that is measured at the seat. It is possible, for instance, to not directly determine the lateral sitting force but for instance capture pressures acting on the seat squab or detect a tilting of the seat squab about an axis running essentially parallel to the vehicle's longitudinal axis. This, too, is covered by the invention.

The invention generally refers to a multitrack curve-tilting vehicle having at least three elements of support, constituted more particularly by wheels, runners, or foils, to at least transmit a lateral guiding force between the vehicle and a ground, at least two of the at least three supporting elements being laterally disposed on opposite sides of the vehicle's longitudinal axis, and at least one of the at least three supporting elements being steerable to control the vehicle's direction. The vehicle moreover comprises means for a lateral tilting of at least one section of the vehicle about a tilting axis running essentially parallel to the vehicle's longitudinal axis, so that the vehicle's center of gravity may be displaced in a direction perpendicular to the direction of travel while driving, particularly so in a bend or on sloping or uneven ground. Preferably, the invention comprises a three-wheeled vehicle where the supporting elements are wheels and which has a curve-tiltable vehicle frame, two of the three wheels being arranged side by side essentially symmetrically to the vehicle's longitudinal axis, and the third wheel being in a centrally offset arrangement. In one embodiment the vehicle is so designed and the lateral tilting by the means for lateral tilting occurs in such a way that the wheels take up an inclined position corresponding to the tilt, and the two wheels that are arranged side by side are perceived as a fictitious central wheel, so that the vehicle may exhibit a driving behavior similar to that of a single-track two-wheeled vehicle. The vehicle seat for a driver steering the vehicle is arranged on the tiltable section of the vehicle.

In addition, the invention comprises a method for tilting a multitrack curve-tilting vehicle, where in one step the lateral sitting force exerted by the body of the driver onto at least a vehicle-seat portion of the vehicle seat in a direction perpendicular to the direction of travel is captured via means of detection, and in a further step the speed of the vehicle is captured, these steps being free to occur in any sequence, and in a further step at least the tiltable section of the vehicle is tilted to a side, this side being determined by the direction of the lateral sitting force and the speed of tilting being a function, at least of the size of the lateral sitting force that was captured, and of the speed that was captured, and the tilting speed being raised with increasing lateral sitting force, but with a factor that decreases with increasing speed of the vehicle.

The invention also comprises tilting vehicles where only one section is tiltable. The invention further comprises vehicles where the driver's seat is eccentrically arranged. In this case it is again possible according to the invention to simulate a driving behavior of the vehicle that corresponds to that of a purely equilibrium-controlled single-track vehicle.

BRIEF DESCRIPTION OF THE DRAWINGS

The method and device according to the invention will be described in the following in more detail with the aid of specific embodiments schematically represented in the drawings, in a purely exemplary fashion, while further advantages of the invention will also be considered. In detail.

DETAILED DESCRIPTION OF THE INVENTION

Figure 1:
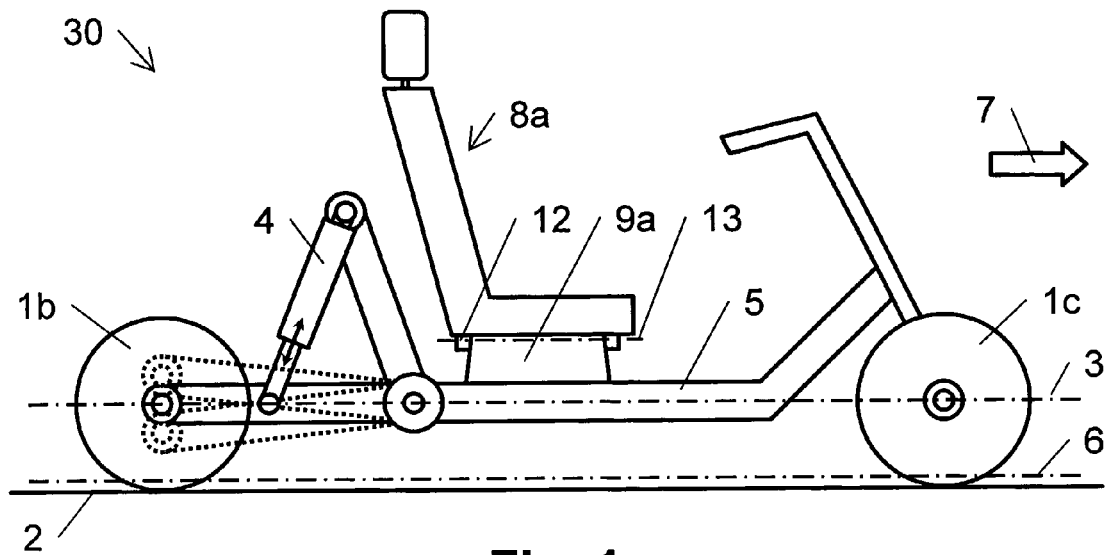
FIG. 1 shows an embodiment of a multitrack curve-tilting vehicle according to the invention in a lateral view.
Figure 2:
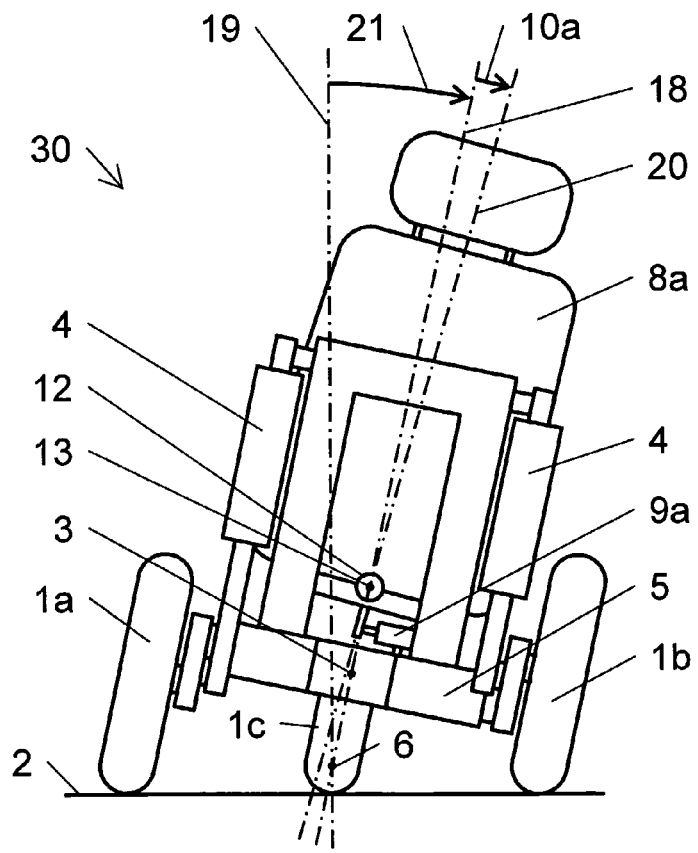
FIG. 2 shows an embodiment of a multitrack curve-tilting vehicle according to the invention in a rear view.
Figure 3:
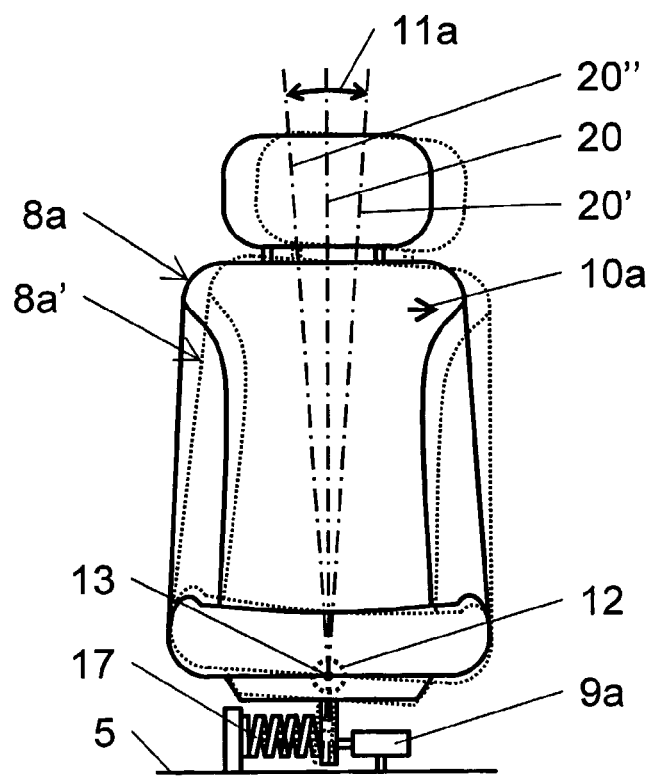
FIG. 3 shows a detailed view of a vehicle seat pivoting in a ball-and-socket joint, with means of detection.

In FIGS. 1 and 2, one possible embodiment of the multitrack curve-tilting vehicle according to the invention is schematically represented in a lateral and in a rear view, respectively. The three-wheeled vehicle 30 represented comprises three supporting elements 1a, 1b, 1c resting on a ground 2 and formed as a front wheel 1c, a right-hand rear wheel 1b, and a left-hand rear wheel 1a. The front wheel 1c is steerable, and is centrally arranged in the vehicle's longitudinal axis 3, while the two lateral wheels 1a and 1b are mounted essentially symmetrically relative to the vehicle's longitudinal axis 3. The three-wheeled vehicle 30 has means 4 for laterally tilting the vehicle's frame 5 about a tilting axis 6 that runs essentially parallel to the vehicle's longitudinal axis 3, so that while traveling, more particularly in a bend or on sloping or uneven ground, the vehicle's center of gravity can be displaced in a direction perpendicular to the direction 7 of travel. The lateral tilting occurs in such a way by the means 4 for lateral tilting, and the three-wheeled vehicle 30 is designed in such a way, that wheels 1a, 1b, 1c take up an inclined position that corresponds to the tilt, as shown in FIG. 2. The two lateral wheels 1a, 1b thus act as a fictitious central wheel in the vehicle's longitudinal axis 3, so that the three-wheeled vehicle 30 essentially has the driving behavior of a single-track two-wheeled vehicle. On the vehicle frame 5 a vehicle seat 8a is arranged which is schematically represented in greater detail in FIG. 3 and which via a ball-and-socket joint 12 is mounted pivotably about an axis 13 of rotation of the vehicle seat that runs essentially parallel to the vehicle's longitudinal axis 3 and is centered relative to the vehicle seat. It thus is possible to pivot the vehicle seat 8a about the axis 13 of rotation of the vehicle seat in a lateral direction 10a perpendicular to the direction 7 of travel, within a range 11a of movement of the vehicle seat. In FIG. 3, the range 11a of movement of the vehicle seat is illustrated by a vertical axis 20 of the vehicle seat in its two limiting positions 20' and 20" at the boundaries of the range 11a of movement of the vehicle seat. For enhanced perspicuity, the range 11a of movement is exaggerated in FIGS. 2 and 3, since in practice it is meaningful to make the range of movement so small that the driver will not notice the pivoting of the vehicle seat 8a. The vehicle seat 8a that is shown with a full line in its central position, is shown with a broken line 8a' at one of the limits of the range 11a of movement of the vehicle seat. Elastic centering means formed as centering springs 17 are provided in order to be able to elastically center the vehicle seat 8a via a restoring force to a central initial position of the vertical axis 20 of the vehicle seat. It thus is possible to determine a lateral sitting force exerted by the driver's body at least on vehicle seat 8a in a lateral direction 10a perpendicular to the direction 7 of travel, via the excursion of vehicle seat 8a from its initial position within the range 11a of movement of the vehicle seat. To this end, means of detection designed as a position detector 9a are mounted beneath the vehicle seat 8a in order to detect the position of vehicle seat 8a within the range 11a of movement of the vehicle seat. The position detector 9a is operatively connected with the means 4 for lateral tilting in such a way that the lateral tilting will occur as a function of the detected lateral sitting force, toward that side corresponding to the direction of the lateral sitting force. FIG. 2 illustrates the process of tilting. The driver exerts a lateral sitting force in a lateral direction 10a perpendicular to the direction 7 of travel by leaning over with his torso, to the right in the example shown, so as to intuitively displace the center of gravity of his body to the right, with the intention that the vehicle would tilt toward the right-hand side. This process occurs for instance in advance of or during a right bend or while driving on a slope falling off to the left. Reacting to the displacement of the body's center of gravity, the vehicle seat 8a is tilting to the right while counteracted by the centering springs 17. This is captured by the position detector 9a sending a signal via the operative connection to the means 4 for lateral tilting, so that the vehicle frame 5 will tilt with a speed that depends on the lateral sitting force, to that side 10a corresponding to the direction of the lateral sitting force, and the vehicle takes on an inclined position 21 that is measured between the vertical direction 19 and the vehicle's vertical axis 18. To tilt the vehicle back again, the driver will displace his center of gravity to the left, so that the three-wheeled vehicle 30 will regain a vertical position. The lateral sitting force is exerted onto the vehicle seat 8a by the driver by actively laterally tilting his trunk while he may lean against a footrest or against the handle bar, in order to initiate the displacement of his body's center of gravity by laterally tilting his trunk. In a possible embodiment, the centering springs 17 have a variable initial spring bias that increases with increasing vehicle speed, so that the restoring force, and thus the sensitivity of the operative connection produced by increasing restoring force, will decrease with increasing speed. It is thus possible that the operative connection between the position detector 9a and the means 4 for lateral tilting are developed in such a way that the speed of tilting is a function, at least of the lateral sitting force and of the vehicle's speed, the tilting speed increasing with increasing lateral sitting force, but with a factor decreasing with increasing vehicle speed. The same can of course be realized as well, for instance, by electronic controls.

In the embodiment shown, the means 4 for lateral tilting are hydraulically controlled. The operative connection (not shown) between the position detector 9a and the means 4 for lateral tilting consists of a hydraulic connection. Here the position detector 9a may be formed by a hydraulic unit, and more particularly by a hydraulic valve, for instance a ⅘ directional control valve controlling the means 4 for lateral tilting via the hydraulic connection. In this case the hydraulic cylinders of the means 4 for lateral tilting are hydraulically linked when the vehicle seat 8a is in its central position, so that a free tilting of the vehicle is possible (two-wheel mode), while upon displacement of the ⅘ directional control valve, hydraulic fluid is actively pumped by a hydraulic pump (not shown) from one to the other cylinder when the seat is inclined because of a lateral sitting force, so that the vehicle will tilt. It can be realized through a check valve (not represented) that an additional free tilting in the direction of active tilting continues to be possible, while a free tilting in the direction opposite to that of active tilting is blocked.

In an alternative version it is possible for the means 4 for lateral tilting to be electrically controlled, and the operative connection between the means 9a of detection and the means 4 for lateral tilting formed as an electrical signal link (not represented). In this case the position detector 9a will for instance consist of a piezoelectric sensor through which the means 4 for lateral tilting can be controlled via the electrical signal link.

Figure 4:
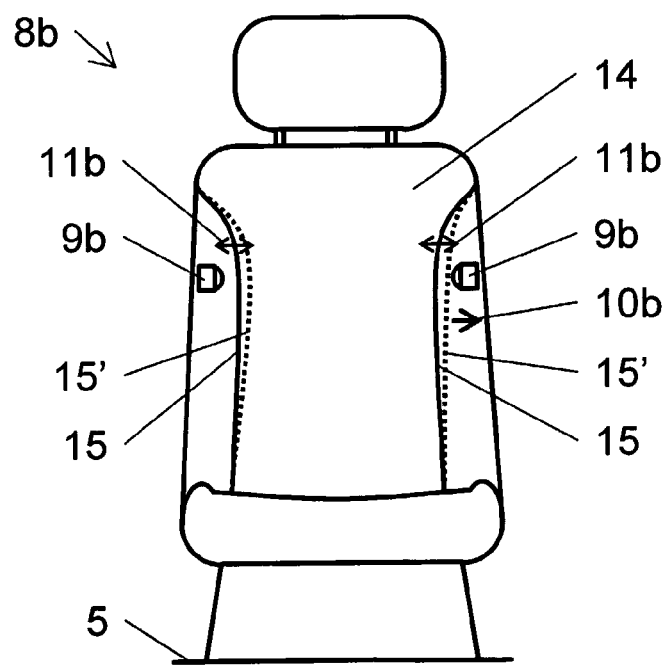
FIG. 4 shows a detailed view of a vehicle seat having flexible lateral bulges, with means of detection.

FIG. 4 shows an alternative embodiment of a vehicle seat 8b having flexible lateral bulges 15 with means 9b of detection consisting of position detectors. The vehicle seat 8b mounted onto the tiltable vehicle frame 5 comprises a backrest 14 at the two flanks of which two lateral bulges 15 are elaborated for providing lateral support for the driver's torso. In a lateral direction 10b perpendicular to the direction 7 of travel, the lateral bulges 15 are mobile or flexible within a range 11b of movement. This mobility can be achieved more particularly by elastic supports for the lateral seat bulges 15 or by elastic cushioning. In their width, the lateral seat bulges 15 can be adjusted so as to adapt to the individual body size of a driver. A pressure is exerted on the particular lateral bulge 15 when the driver attempts to intuitively displace the center of gravity of his body laterally in the intended tilt direction in order to tilt the three-wheel vehicle 30 by laterally twisting his trunk. This pressure, which corresponds to a lateral sitting force, causes at least one of the two lateral seat bulges 15 to be deformed or moved, which in FIG. 4 is represented by broken lines of lateral seat bulges 15', this deformation or movement of the lateral seat bulges 15 being captured by the position detectors 9b that have been placed, whereupon a lateral tilting will occur as described above in the direction in which the particular lateral seat bulge 15 has been pushed outwardly. Thus, the operative connection between the position detectors 9b and the means 4 for lateral tilting is designed so that the three-wheeled vehicle will be tilted toward the side corresponding to the direction of the lateral sitting force. The position detectors 9b may consist for instance of known pressure switches or of two pads having an integrated pressure sensor. In a special embodiment, a fluid cushion is present in each of the two lateral bulges 15, the two fluid cushions being in fluidic communication. A pressure difference detector or flow sensor detects any possible difference in pressure between the two lateral seat bulges 15, and thus a lateral sitting force exerted by the driver onto the vehicle seat. In a further special embodiment (not represented) of the invention, the means of detection, for instance in the form of two fluid cushions, are located in the left-hand and right-hand halves of the seat squab of the vehicle seat.

Figure 5:
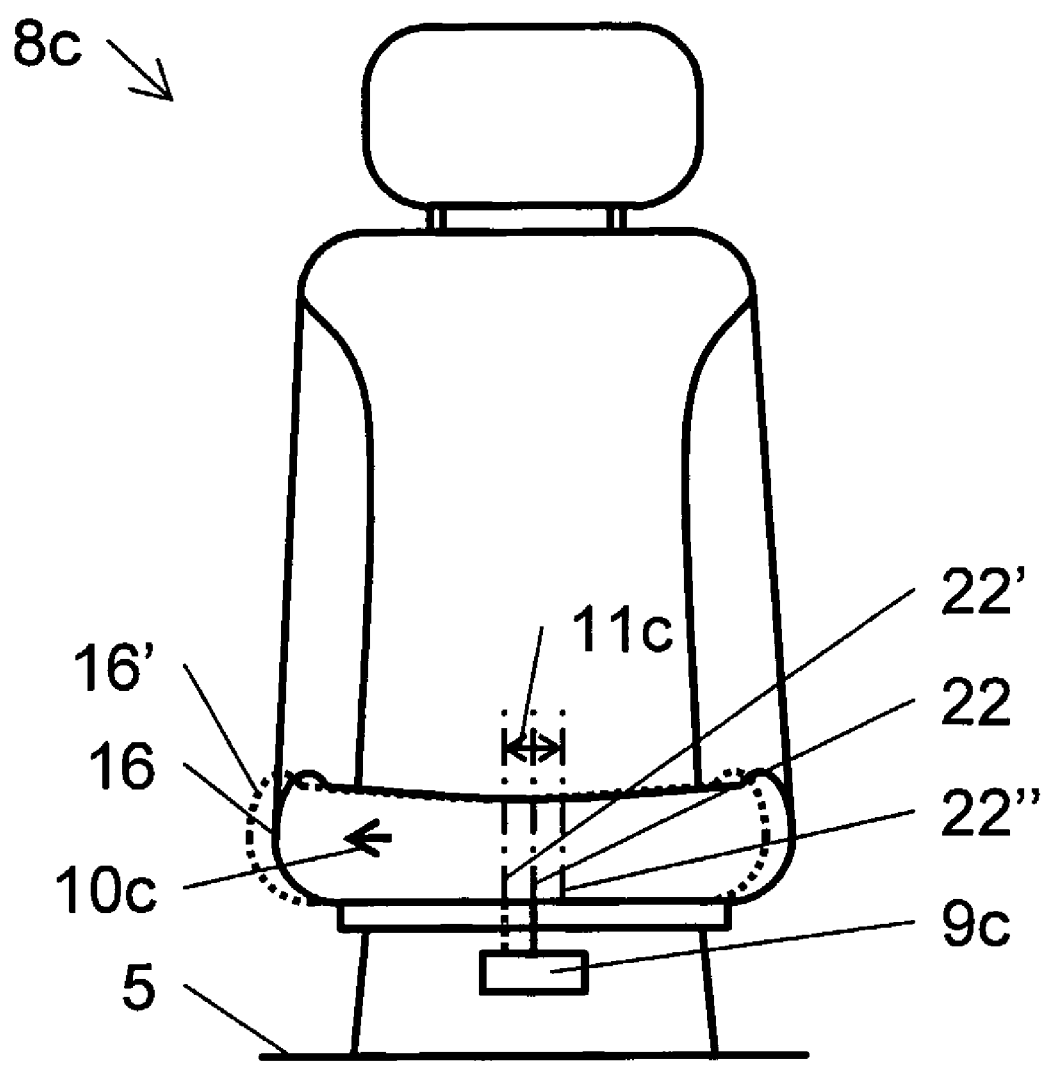
FIG. 5 shows a detailed view of a vehicle seat with a mobile seat squab, with means of detection.

FIG. 5 shows a further alternative embodiment of a vehicle seat 8c with means 9c of detection. The vehicle seat 8c comprises a seat squab 16 that is mobile in a lateral direction 10c perpendicular to the direction 7 of travel within a range 11c of movement. The range 11c of movement is illustrated in FIG. 5 in terms of the seat squab's vertical axis 22 and its two extreme positions 22' and 22". This mobility is achieved, for instance, via a linear roller bearing. In the driver's attempt to intuitively displace his body's center of gravity by leaning with his trunk in the direction toward which the vehicle is supposed to tilt, a lateral sitting force is exerted onto the seat squab 16 of vehicle seat 8c in a direction opposite to the desired direction of tilting. An outward shift (shown by broken lines of seat squab 16' in FIG. 5) of the seat squab 16 that is elastically centered by centering springs (not shown), is captured by means of detection constituted by a position detector 9c, triggering via the operative connection between the position detector 9c and the means 4 for lateral tilting a lateral tilting toward the side opposite to the direction of the lateral sitting force. In contrast to the embodiments shown in FIGS. 3 and 4, the tilting thus occurs in the direction opposite to that of the lateral sitting force. In a further embodiment, the backrest of the vehicle seat 8c is omitted altogether, so that a saddle with seat squab 16 constitutes the entire vehicle seat 8c.

Other embodiments for the detection of a lateral sitting force or of a displacement of the body's center of gravity can of course be realized, for instance in the seat squab or in the backrest. The invention is not restricted to the embodiments represented schematically, and purely in an exemplary fashion, and it is not restricted in particular to a three-wheeled vehicle with a single front wheel and two independent rear wheels but generally comprises curve-tilting carriages of any build.

The invention claimed is:

1. Multitrack curve-tilting vehicle having at least three supporting elements for at least the purposes of transmitting a lateral guiding force between the vehicle and a ground, wherein
    at least two of the at least three supporting elements are laterally disposed on opposite sides of the vehicle's longitudinal axis and
    at least one of the at least three supporting elements can be steered for directional control of the vehicle,
with
    means for laterally tilting at least one section of the vehicle about a tilting axis running essentially parallel to the vehicle's longitudinal axis, so that while driving, the center of gravity of the vehicle can be displaced in a direction perpendicular to the direction of travel, and
    at least one vehicle seat disposed on the tiltable section of the vehicle, for a driver steering the vehicle,
characterized in that
    means of detection are provided for capturing a lateral sitting force exerted by the driver's body onto at least one vehicle-seat portion of the vehicle seat in a lateral direction perpendicular to the direction of travel,
    the means of detection are in operative connection with the means for lateral tilting, in such a way that
        the lateral tilting occurs as a function of the detected lateral sitting force and
        the tilting speed is a function, at least of the lateral sitting force and the speed of the vehicle, the tilting speed increasing with increasing lateral sitting force, with a factor that decreases with increasing vehicle speed.

2. Multitrack curve-tilting vehicle of claim 1, characterized in that
    the supporting elements are formed as wheels, and the vehicle is formed as a three-wheeled vehicle with a curve-tiltable vehicle frame, wherein two of the three wheels are arranged side by side essentially symmetrically relative to the vehicle's longitudinal axis, and the third wheel is arranged essentially in the vehicle's longitudinal axis but centrally offset, and
    the lateral tilting by the means for lateral tilting occurs in such a way, and the vehicle is designed in such a way that the wheels assume an inclined position corresponding to the tilt, and the two wheels positioned side by side act like a fictitious single central wheel essentially in the vehicle's longitudinal axis.

3. Multitrack curve-tilting vehicle of claim 1, characterized in that
    at least a vehicle-seat portion of the vehicle seat is mobile in a lateral direction perpendicular to the direction of travel within the range of movement of the vehicle seat, and
    the means of detection are so designed that they capture quantitatively or qualitatively the lateral sitting force by a direct or indirect measurement of force or distance at least at the vehicle-seat portion of the vehicle seat.

4. Multitrack curve-tilting vehicle of claim 3, characterized in that
    the vehicle seat or the vehicle seat portion is mounted in such a way via a ball-and-socket joint with an axis of rotation of the vehicle seat running essentially parallel to the vehicle's longitudinal axis and centered relative to the vehicle seat that the vehicle seat is pivotable about the axis of rotation of the vehicle seat into the lateral direction perpendicular to the direction of travel within the range of movement of the vehicle seat.

5. Multitrack curve-tilting vehicle of claim 4, characterized in that
    the operative connection between the means of detection and the means for lateral tilting are formed in such a way that the lateral tilting occurs toward the side that corresponds to the direction of the lateral sitting force.

6. Multitrack curve-tilting vehicle of claim 3, characterized in that
    the vehicle seat has a backrest with lateral bulges for lateral support of the driver's torso and the lateral bulges form the vehicle seat portion that is mobile in the lateral direction perpendicular to the direction of travel within the range of movement of the vehicle seat.

7. Multitrack curve-tilting vehicle of claim 3, characterized in that
the vehicle seat comprises a seat squab or is designed as a seat squab and
the seat squab forms the vehicle seat portion that is mobile in the lateral direction perpendicular to the direction of travel within the range of movement of the vehicle seat.

8. Multitrack curve-tilting vehicle of claim 7, characterized in that
the operative connection between the means of detection and the means for lateral tilting are formed in such a way that the lateral tilting occurs toward the side opposite to the direction of the lateral sitting force.

9. Multitrack curve-tilting vehicle of claim 3, characterized in that
elastic centering means are provided which center at least the vehicle seat portion that is mobile in the lateral direction perpendicular to the direction of travel within the range of movement of the vehicle seat portion, through a restoring force to a central initial position, so that from the position of at least the vehicle-seat portion of the vehicle seat with in the range of movement of the vehicle seat the lateral sitting force can be determined, and
the means of detection are formed as at least one position detector capturing the position of at least the vehicle seat portion of the vehicle seat within the range of movement of the vehicle seat, so that the lateral sitting force can be captured.

10. Multitrack curve-tilting vehicle of claim 9, characterized in that
the elastic centering means are formed as centering springs having a variable initial spring bias that increases with increasing vehicle speed, and thus an increasing restoring force.

11. Multitrack curve-tilting vehicle of claim 1, characterized in that
the means for lateral tilting can be controlled hydraulically, and
the operative connection between the means of detection and the means for lateral tilting are formed as a hydraulic connection and
the means of detection are formed as hydraulic means of detection, through which the means for lateral tilting can be controlled via the hydraulic connection.

12. The vehicle of claim 11, wherein said hydraulic means of detection comprises a hydraulic valve.

13. The vehicle of claim 12, wherein said valve comprises a 4/3 directional control valve.

14. Multitrack curve-tilting vehicle of claim 1, characterized in that
the means for lateral tilting can be controlled electrically, and
the operative connection between the means of detection and the means for lateral tilting are formed as an electrical signal link and
the means of detection are formed as electrical means of detection, through which the means for lateral tilting can be controlled via the electrical signal link.

15. The vehicle of claim 14, wherein said means of detection comprises a piezoelectric sensor.

16. The vehicle of claim 1, wherein said driving is on a bend, or on sloping or uneven ground.

17. Method for tilting a multitrack curve-tilting vehicle with
means for lateral tilting of at least one section of the vehicle about a tilting axis that runs essentially parallel to the vehicle's longitudinal axis, so that during travel, the vehicle's center of gravity can be shifted in a direction perpendicular to the direction of travel,
at least one vehicle seat disposed on the tiltable section of the vehicle, for a driver steering the vehicle, and
means of detection for capturing a lateral sitting force exerted by the driver's body onto at least one vehicle-seat portion of the vehicle seat in a lateral direction perpendicular to the direction of travel,
including the repeating steps of
capturing the lateral sitting force with the means of detection,
capturing the speed of the vehicle, and
tilting at least the section of the vehicle toward one side, wherein
the side is determined by the direction of the lateral sitting force and
the tilting speed is a function, at least of the size of the captured lateral sitting force and the captured velocity, and the tilting speed increases with increasing lateral sitting force, with a factor that decreases with increasing vehicle speed.

18. Method of claim 17, wherein
the tilting occurs toward the side corresponding to the direction of the lateral sitting force.

19. Method of claim 17, wherein
the tilting occurs toward the side opposite to the direction of the lateral sitting force.

20. The method of claim 17, wherein said travel is in a bend, or on sloping or uneven ground.

* * * * *